United States Patent [19]

Graham

[11] Patent Number: 4,615,315
[45] Date of Patent: Oct. 7, 1986

[54] OIL CLEANING ASSEMBLIES FOR ENGINES

[75] Inventor: Neil A. Graham, Chard, England

[73] Assignee: AE PLC, Warwickshire, England

[21] Appl. No.: 731,131

[22] Filed: May 6, 1985

[30] Foreign Application Priority Data

May 4, 1984 [GB] United Kingdom ............. 8411503

[51] Int. Cl.$^4$ ............................................. F01M 1/00
[52] U.S. Cl. .............................. 123/196 A; 184/6.24; 210/168
[58] Field of Search ............. 123/196 R, 196 A; 210/377, 294, 297, 429, 512.1, 405, 168; 184/6.24

[56] References Cited

U.S. PATENT DOCUMENTS

| 2,076,935 | 4/1937 | Burckhalter | 184/6.24 |
| 4,093,552 | 6/1978 | Guyer | 210/297 |
| 4,253,952 | 3/1981 | Libertini | 210/168 |
| 4,284,504 | 8/1981 | Alexander et al. | 210/168 |
| 4,492,631 | 1/1985 | Martin | 210/377 |

FOREIGN PATENT DOCUMENTS

| 554445 | 7/1943 | United Kingdom . |
| 2032296 | 5/1980 | United Kingdom . |

OTHER PUBLICATIONS

WO83,02072, Wilson et al.

Primary Examiner—E. Rollins Cross
Attorney, Agent, or Firm—Pearne, Gordon, Sessions, McCoy, Granger & Tilberry

[57] ABSTRACT

An oil cleaning assembly for an internal combustion engine comprising a centrifugal separator rotor and an oil filter element, wherein the filter element is located in an annular housing which extends around the rotor.

6 Claims, 4 Drawing Figures

OIL CLEANING ASSEMBLIES FOR ENGINES

This invention concerns lubricating oil cleaning assemblies for engines particularly internal combustion engines. Servicing engines and particularly car and truck engines is a labour-intensive operation which needs to be done rapidly so disposable oil-cleaning units need to be used wherever possible.

Oil cleaning has been conventionally effected either with full flow filter which interpose a paper filter in the path of all the oil leaving the lubricating oil pump, or with centrifugal separators which by-pass a part of the oil leaving the pump and return it to the engine sump. Both arrangements have their advantages and disadvantages. Full flow filters are cheap (and thus are usually disposable) and filter all the oil each time it is cycled but tend to get clogged which hampers the efficiency of the lubricating system. This is particularly the case if the filter element has fine pores to remove fine contaminants. On the other hand, fine contaminants are not such a problem with centrifugal separators.

According to the present invention, there is provided an oil cleaning assembly for an internal combustion engine comprising a centrifugal separator rotor and an oil filter element, wherein the filter element is located in an annular housing which extends around the rotor.

Such an arrangement has the advantage that the annular housing containing the filter element can be made wholly disposable such that when it is removed, it exposes the rotor. If the rotor is also disposable, it can be replaced at the same time as the housing without disassembly of a further casing.

In a preferred form of the present invention, the separator itself is not disposable but the rotor is. A disposable rotor should be non-disassemblable and tamper-proof and helps prevent ingress of dirt during maintenance.

Preferred embodiments of the invention will now be described by way of example with reference to the drawings in which.

Figure 1:
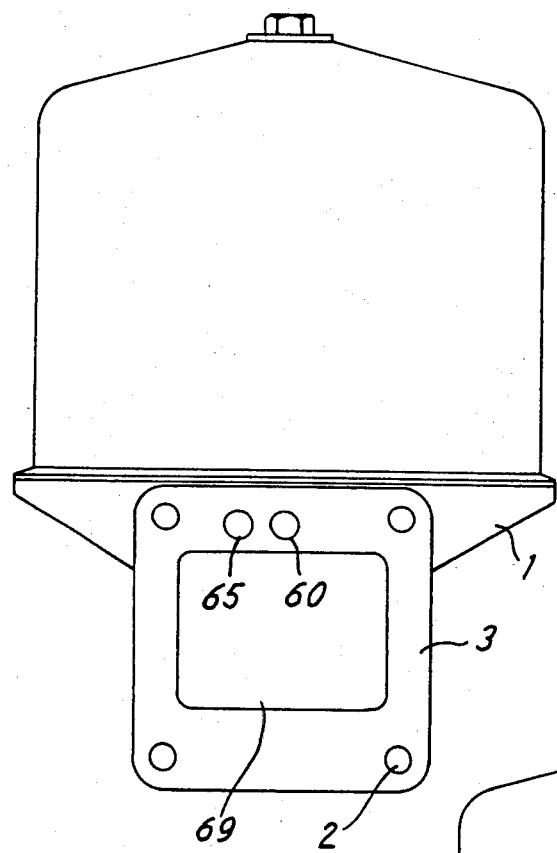
FIG. 1 is an elevation of an assembly according to the invention.
Figure 2:
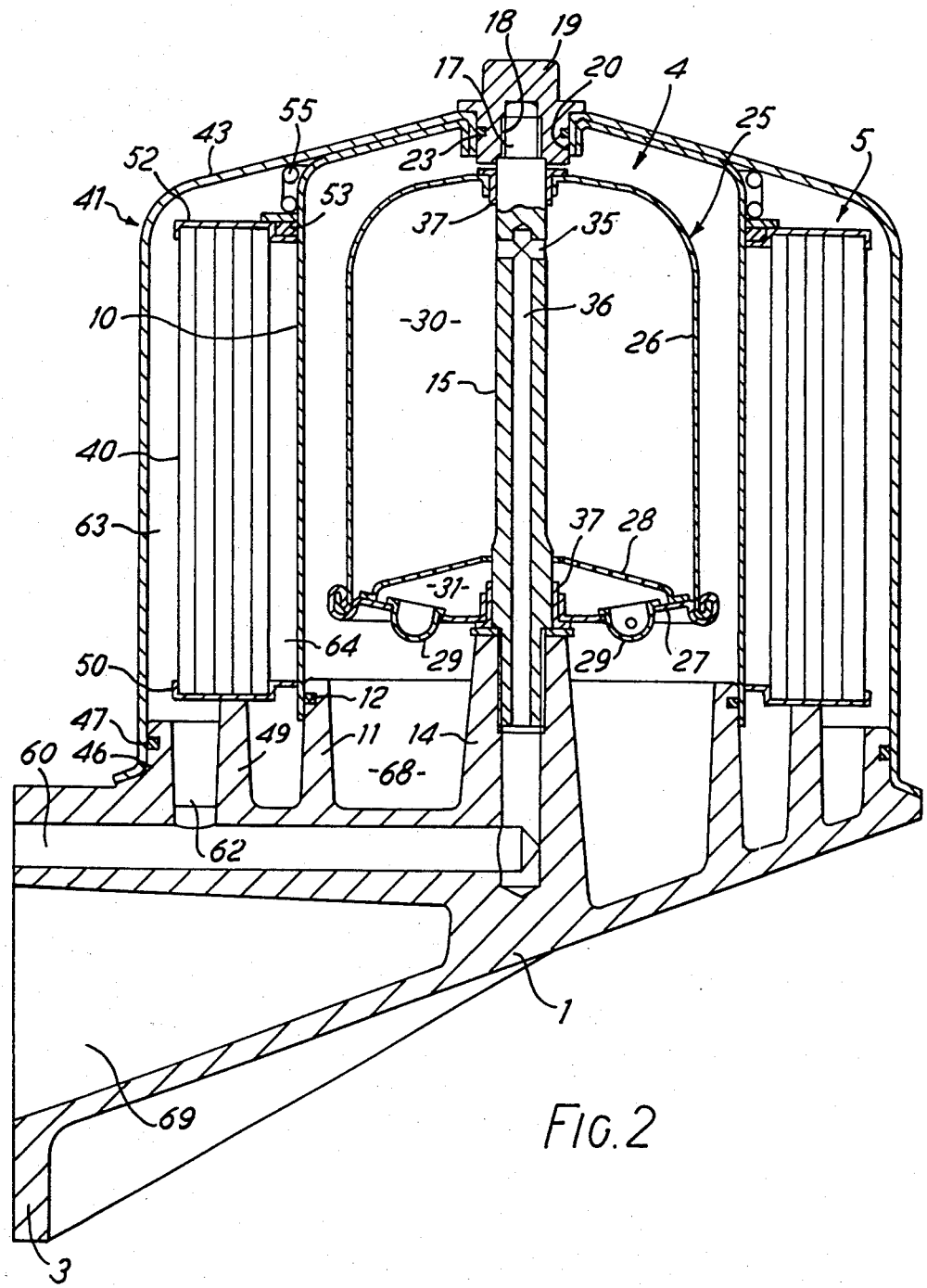
FIG. 2 is a median vertical section in a direction at right angles to the view shown in FIG. 1.

As shown in FIGS. 1 and 2, a mounting member 1, which in use is bolted to an engine by means of four bolt holes 2 in a mounting flange 3, carries a combined centrifugal separator 4 and a filter 5 for cleaning the lubricating oil used in the engine.

The centrifugal separator 4 has a bell-shaped inner casing 10 which fits over the outside of an upstanding circular wall 11 on the member 1 and a seal 12 is mounted in a groove in the wall 11 to prevent leakage of oil. A tubular projection 14 extends upwardly from the member 1 coaxially with the wall 11 and screwed into the upper end of the projection 14 is a hollow shaft 15. At the upper end of the shaft 15 a threaded portion 17 is received in a threaded bore 18 in a flanged stud or nut 19 in an opening 20 in the top of the housing, a seal 23 being provided in a groove in the stud 19 to prevent leakage of oil. Thus the inner casing 10 is held in place by screwing the stud 19 onto the shaft 15 by means of a spanner or the like.

A pressed metal disposable rotor 25 is freely rotatable on the shaft 15 and comprises a bell-shaped rotor housing 26, a base plate 27, an intermediate plate 28 and a pair of jets 29. The intermediate plate 28 is welded to the base plate 27 to define an upper chamber 30 and a lower chamber 31 which communicate through an annular space 32 adjacent the shaft 15. The base plate 27 is secured to the housing 28 by a fold-over or welded joint and the two hemispherical flanged jets 29 are secured in openings in the base plate so that oil leaving them is directed tangentially in the same rotary direction so as to spin the rotor and cause contaminants in the oil to be deposited on the outer wall of the upper chamber 30. Alternatively the jets can be formed in the pressing of the base plate. Oil enters the upper part of the chamber 30 via a transverse bore 35 which intersects the longitudinal bore 36 in the shaft 15. Flanged annular bearing members 37 of suitable bearing metal are provided at the top and bottom of the rotor 25 between the rotor and the shaft.

The filter 5 comprises an annular corrugated paper filter element 40 in an annular housing 41 formed by inner casing 10 and a bell-shaped outer casing 43 welded or otherwise secured to the inner casing 10 at the top and provided with an aligned opening 44 for stud 19. The lower end of outer casing 43 engages with an upstanding circular wall 46 of member 1 with a seal 47 being provided in a similar manner to seal 12. An intermediate circular wall 49 of the member 1 engages the underside of a channel-shaped annular filter retainer 50 secured to casing 10. The upper end of filter element 40 is retained by a similar annular filter retainer 52 which carries a seal 53 and is vertically slidable on casing 10, the seal 53 preventing oil by-passing the element 40. A spring 55 urges the retainer 52 downwards so that the element 40 is tightly and sealingly held by both retainers. As shown in FIG. 2 oil from the engines pump enters bore 60 in member 1 and is supplied to the separator via the tubular projection 14 and via a bore 62 to the space 63 in the housing 41 outside the filter element 40 which operates in a conventional way. Filtered oil leaving the space 64 inside the element 40 passes to bore 65 whence it leaves the member 1 for the engine lubrication rail. The annular chamber 68 around the projection 14 below the rotor is connected to the opening 69 which leads to the engine sump. Air vent means (not shown), such as a bleed hole to the atmosphere at the top of the housing 41 and communicating with the interior of casing 10, may be provided to ensure that air entrained by the oil draining to the sump is replaced and that oil does not back up and stop the rotor.

When the time comes to change the filter and the rotor the stud 19 is unscrewed and the housing 41 with the element 40 therein is lifted off and discarded. Similarly the rotor 25 is lifted off the shaft 15 and discarded. A new rotor and a new housing are then placed in position and the stud 19 replaced and tightened.

Figure 3:
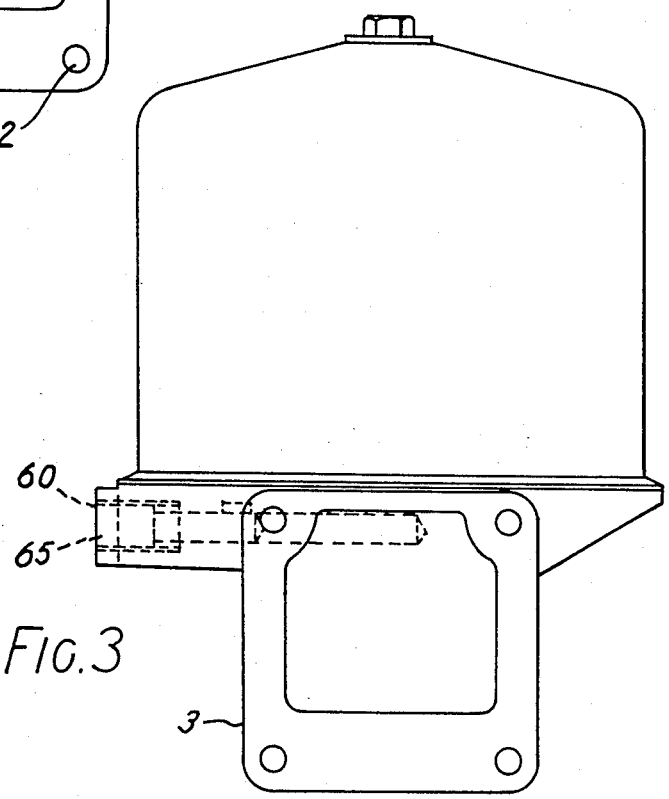
FIGS. 3 and 4 are views similar to FIGS. 1 and 2 of a second embodiment.
Figure 4:
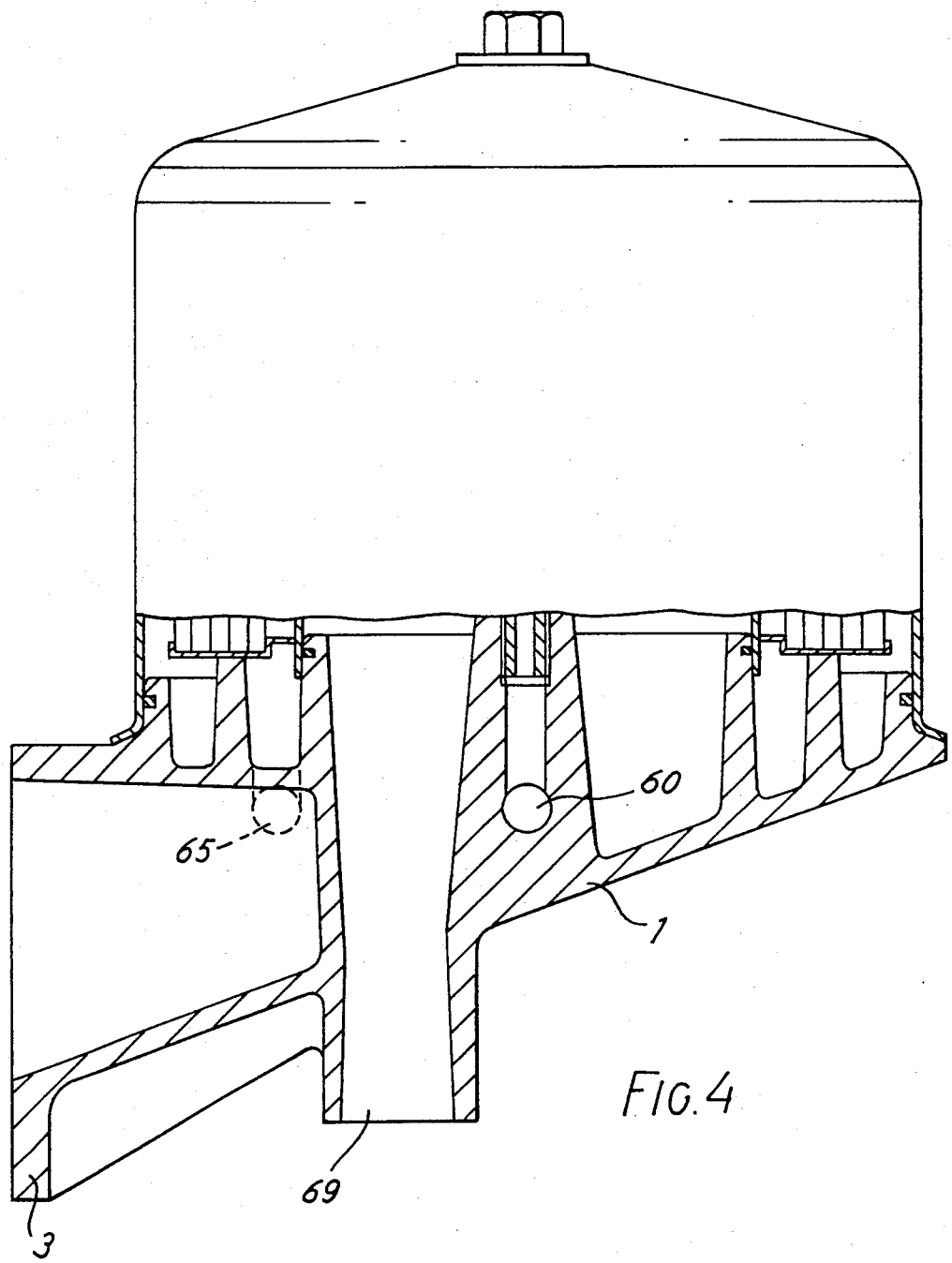

The embodiment of FIGS. 3 and 4 is similar to that of FIGS. 1 and 2 and will not be described in detail. Separate connections 60, 65, 69 are provided outside the flanges for the oil inlet and outlets.

I claim:

1. An oil cleaning assembly for an internal combustion engine comprising a mounting member, a by-pass flow centrifugal separator having a rotor mounted on said mounting member for rotation about a substantially vertical axis, an inner casing enclosing said rotor, an annular disposable filter element disposed around said inner casing, an outer casing enclosing said filter element and said inner casing, means releasably securing said inner and outer casing in sealing engagement with said mounting member, an inlet passage to supply high pressure oil from the engine to said centrifugal separator and to said filter element, and drain passage means to return oil from said assembly to the engine.

2. An oil cleaning assembly according to claim 1, wherein said drain passage means includes a first passage connecting said centrifugal separator with the engine sump and a second passage connecting said filter element with the engine lubrication system.

3. An oil cleaning assembly according to claim 1, wherein said inner and outer casings are releasably secured to the rotor mounting member.

4. An oil cleaning assembly according to claim 3, wherein said rotor mounting means comprises a hollow vertically extending shaft secured to said mounting member.

5. An oil cleaning assembly according to claim 4, wherein a nut is threadedly secured to said shaft to hold said inner and outer casings against said mounting member.

6. An oil cleaning assembly for an internal combustion engine, comprising a by-pass flow substantially vertically disposed centrifugal separator having an annular casing and an oil nozzle-driven disposable rotor rotatable therein, an annular disposable filter element disposed around said annular casing, an outer casing for the filter element, and a mounting member for mounting said casings by means of a releasable connection in such a way that the separator casing is upstanding from the mounting member, the mounting member having first passage means for supplying high pressure oil from the engine pump to an inlet of the separator and an inlet for the filter, second passage means for receiving oil from the centrifugal separator and returning it to the engine sump and third passage means for receiving oil from the filter and supplying it to a pressurised engine lubricating system.

* * * * *